J. B. ZINK.
CAR-COUPLING.
No. 189,540. Patented April 10, 1877.
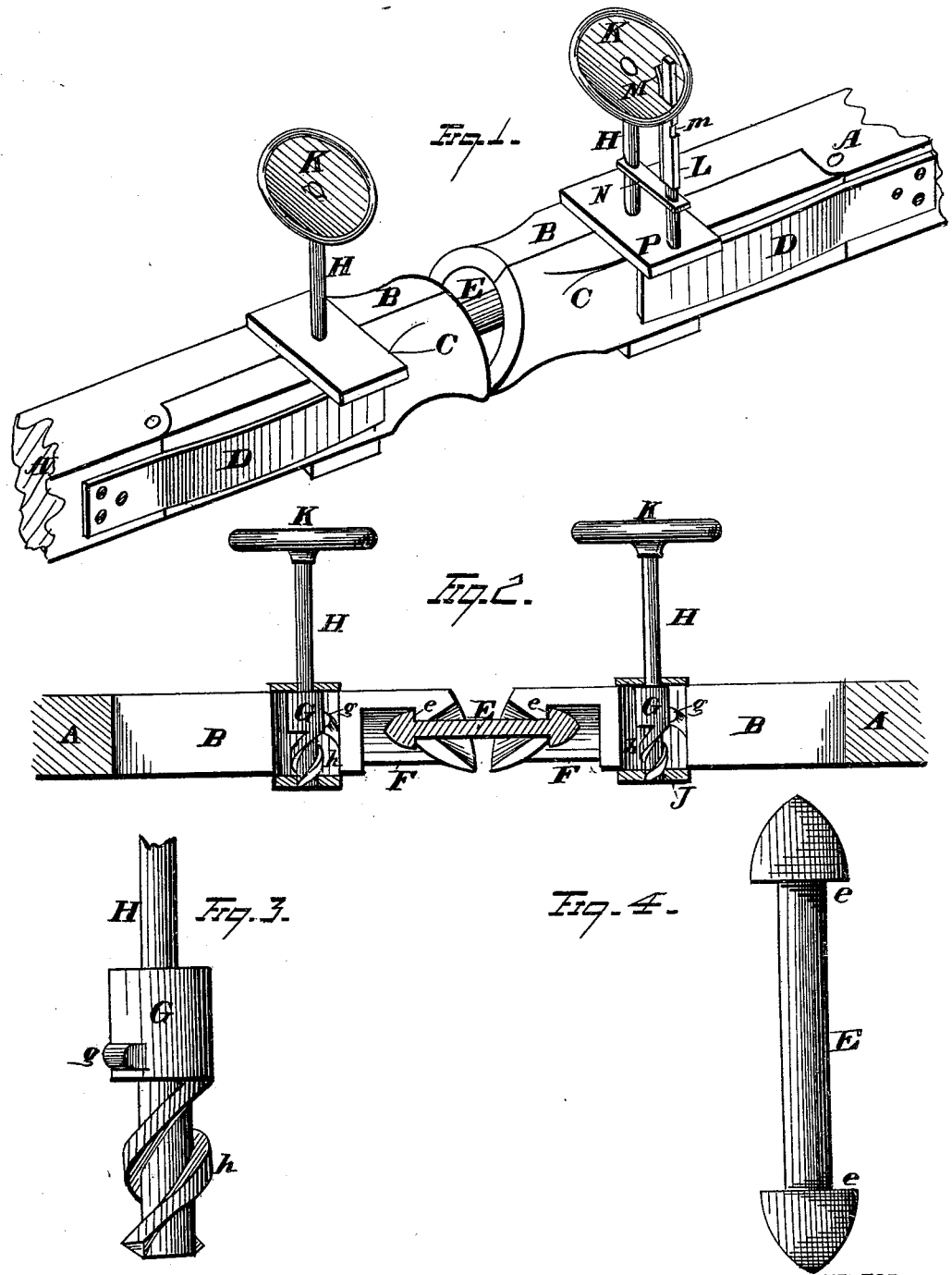
WITNESSES
INVENTOR

UNITED STATES PATENT OFFICE.

JACOB B. ZINK, OF UNION CITY, MICHIGAN.

IMPROVEMENT IN CAR-COUPLINGS.

Specification forming part of Letters Patent No. 189,540, dated April 10, 1877; application filed January 18, 1877.

*To all whom it may concern:*

Be it known that I, JACOB B. ZINK, of Union City, in the county of Branch and State of Michigan, have invented certain new and useful Improvements in Car-Coupling; and I do hereby declare the following to be a full, clear, and exact description of the invention, such as will enable others skilled in the art to which it pertains to make and use it, reference being had to the accompanying drawings, which form part of this specification.

My invention relates to improvements in self-couplings for railroad-cars; and consists of spring-pressed jaws constructed to allow the coupling-bolt to fall by its gravity through a lower slot in disengagement from its draw-head, as the latter is operated by a cam-drum. This actuating drum, which forces the spring-pressed jaws apart, is controlled by a vertical shaft extending upward, and having a hand-wheel at its upper extremity, which is provided with a lock-catch to secure it from accidental turning.

Referring to the drawings, Fig. 1 is a view in perspective; Fig. 2, a longitudinal section; Fig. 3, a detached view of the cam-drum and its locking mechanism; and Fig. 4, a detailed view of the coupling bolt.

A represents the draw-bar of a car, having in front extension the fixed jaw B and the movable jaw C, the two forming the draw-head. The movable jaw C swings freely in a horizontal plane and with lateral inclination to the draw-head upon a pivot in its rear end, which secures it in a knuckle-joint. It is pressed inward or against the fixed jaw by a piece of spring-metal, D, rigidly secured in its rear to the side of the draw-head, and extending forward along the side of the movable jaw sufficiently to bear with strong force against any tendency of the same to swing outward. The spring in the drawing is shown as being nearly a straight bar; but I may use an elliptical spring or a bar more curved than the one shown. So, too, if desired, I may make both of the jaws movable, and pressed by springs; or I may make the two jaws of a single piece of spring-metal having a continuous and single rear, with bifurcated forward arms, forming the grasping cheeks or jowls of the draw-head. The mouth or opening which receives the coupling-bolt E is, when the jaws are closed, of just sufficient diameter to allow the loose working of the bolt, while it is incapable of being opened far enough by the actuating mechanism to admit of the withdrawal of the bolt-head through it. To uncouple the bolt, I provide a slot, F, cut in the lower or under body of the draw-head opening, which receives the receives the coupling, and upon spreading the jaws apart the head of the coupling falls down through this lower slot, and is disengaged automatically from the draw-head, while the cars are still.

I thus obtain a continuously-circular bearing for the head of the coupling-bolt, and also am enabled to uncouple cars automatically without placing them in motion, since the bolt of its own gravity falls down through the lower slot as soon as the jaws release it, and without having to be drawn out through a horizontal plane.

The coupling-bolt E is made as a double-headed arrow-bolt, with the square shoulders $e\ e$ extending continuously around the bolt and giving an uninterrupted annular bearing to the bolt as it engages in the corresponding circular recess formed in the interior front of the grasping-jaws. These jaws are spread apart by the drum G working in a slotted recess between the two jaws in the rear of the draw-head opening, and this drum is mounted on a vertical shaft, H, which has a screw-tapped lower extremity, $h$, which engages with a correspondingly-threaded slot in the plate J, which latter is secured to the under side of the fixed jaw. The drum carries a cam, $g$, rigidly secured to its periphery, which projects from it at a gradual inclination, and, by its bearing against the inner side of the movable jaw, causes the latter to be forced outward with sufficient strength to overcome the spring-bar D and allow the coupling to be detached. The actuating-shaft H extends upward to be operated by the brakeman on the car, and is provided at its upper end with the hand-wheel K. This hand-wheel has a slot in its body admitting the locking-shaft L, which engages therewith by a parallel spring, M, pressing its recessed side $m$ against the wheel, and thus guarding the locking-shaft against vertical displacement. This shaft L passes down through a slotted guide, N, and engages with the locking-plate P, which latter is rigidly secured to the upper side of the fixed jaw. By allowing the shaft L to pass into the slotted opening of the fixed locking-plate P the handwheel is effectually prevented from turning or accidental displacement.

The cam-drum may be of the same piece with its actuating-shaft, or the two may be in separate parts rigidly attached to one another, and, if both jaws are made movable, there may be double cams on the drum, and in such latter instance the central slot in the locking-plate P, through which the actuating-shaft H passes, should be made laterally elongated. But my preferable manner of manufacturing the draw-heads is set forth in the accompanying drawings.

It will be observed that, in the act of uncoupling, the coupler is raised sufficiently to allow of the disengagement of the bolt from the draw-bar, and thus the disconnection is easily effected.

If desirable, I may introduce the cam-drum in operative position, so that it may be actuated from the side of the car by the brakeman standing on the ground instead of on the car. Suitable connecting mechanism similar in principle to that above described would, in this latter instance, continue out in a horizontal plane from the draw-bars, and, being provided at its extreme lateral extension with a hand-wheel, could be readily controlled.

Having fully described my invention, what I claim as new, and desire to secure by Letters Patent, is—

1. The combination, with the draw-head, constructed with fixed and spring-pressed jaws, of a cam, G, and locking mechanism M m L P, substantially as and for the purpose set forth.

2. The combination, with the draw-head, constructed with fixed and spring-pressed jaws, of an actuating-shaft, H, provided with a cam and a screw, the latter adapted to engage with a plate secured to the under side of the draw-head, substantially as and for the purpose set forth.

In testimony that I claim the foregoing I have hereunto set my hand this 11th day of January, 1877.

JACOB BLACKBURN ZINK.

Witnesses:
 G. F. HURD,
 JOSEPH ZINK.